(12) United States Patent
Shimoyama

(10) Patent No.: US 7,493,508 B2
(45) Date of Patent: Feb. 17, 2009

(54) INFORMATION PROCESSING DEVICE, METHOD, AND PROGRAM

(75) Inventor: Takeshi Shimoyama, Tokyo (JP)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 10/527,063

(22) PCT Filed: Jul. 30, 2003

(86) PCT No.: PCT/JP03/09634

§ 371 (c)(1),
(2), (4) Date: Mar. 9, 2005

(87) PCT Pub. No.: WO2004/031939

PCT Pub. Date: Apr. 15, 2004

(65) Prior Publication Data

US 2006/0010334 A1    Jan. 12, 2006

(30) Foreign Application Priority Data

Sep. 30, 2002   (JP) .......................... P2002-286524

(51) Int. Cl.
*G06F 13/00* (2006.01)

(52) U.S. Cl. .................. 713/400; 413/401; 413/500; 413/501; 413/502; 413/503; 413/600; 413/601; 712/218

(58) Field of Classification Search .............. 713/375, 713/400, 401, 500–503, 600, 601; 712/218
See application file for complete search history.

(56) References Cited

U.S. PATENT DOCUMENTS

| | | | | |
|---|---|---|---|---|
| 5,703,884 A | * | 12/1997 | Ozaki | 714/30 |
| 5,784,384 A | * | 7/1998 | Maeno | 714/726 |
| 6,247,134 B1 | * | 6/2001 | Sproch et al. | 713/320 |
| 6,829,716 B2 | * | 12/2004 | Cook et al. | 713/500 |
| 6,972,998 B1 | * | 12/2005 | Gibson et al. | 365/189.05 |
| 7,058,830 B2 | * | 6/2006 | Dhong et al. | 713/320 |

(Continued)

FOREIGN PATENT DOCUMENTS

GB         0524712 A2 *  7/1991

(Continued)

*Primary Examiner*—Abdelmoniem Elamin
(74) *Attorney, Agent, or Firm*—Oblon, Spivak, McClelland, Maier & Neustadt, P.C.

(57) ABSTRACT

This invention relates to an information processing apparatus as well as to an information processing method and a program for use therewith, the apparatus being arranged to prevent a drop in its processing performance while minimizing power dissipation when a frequency-variable synchronizing clock signal CLK of the apparatus is lowered in frequency. Illustratively, if a selector block 31-2 receives a selection command "select B" which is set depending on the frequency of the synchronizing clock signal CLK and which specifies the bypassing of a holding block 12-2, then data input to and held by a holding block 12-1 on a first clock pulse of the clock signal CLK is arranged, on a second clock pulse, to pass through a selector block 31-1 and a signal processing block 13-1, bypass the holding block 12-2, pass through the selector block 31-2 and a signal processing block 13-2, and be input to and held by a holding block 12-3. This invention applies to data processing apparatuses such as CPUs, DSPs and filters as well as to buses.

13 Claims, 12 Drawing Sheets

U.S. PATENT DOCUMENTS 7,131,017 B2 * 10/2006 Schmit et al. ............... 713/323
2001/0056552 A1   12/2001 Cook et al.

FOREIGN PATENT DOCUMENTS

| | | |
|---|---|---|
| IT | 0703663 A1 * | 9/1994 |
| JP | 05-313854 | 11/1993 |
| JP | 6-295243 | 10/1994 |
| JP | 8-147163 | 6/1996 |
| JP | 08-316838 | 11/1996 |
| JP | 2002-297260 | 10/2002 |
| WO | WO 01/33351 A1 | 5/2001 |

* cited by examiner

FIG. 5

| FREQUENCY INFORMATION infq | SYNCHRONIZING CLOCK SIGNAL CLK |
|---|---|
| 00 | 10MHZ |
| 01 | 33MHZ |
| 10 | 50MHZ |
| 11 | 100MHZ |

FIG. 6

| FREQUENCY INFORMATION infq | SYNCHRONIZING CLOCK SIGNAL CLK |
|---|---|
| 10 | 10MHZ |
| 3 | 33MHZ |
| 2 | 50MHZ |
| 1 | 100MHZ |

FIG. 8

| HOLDING BLOCK 12-1 | | HOLDING BLOCK 12-2 | | HOLDING BLOCK 12-3 | | HOLDING BLOCK 12-4 | |
|---|---|---|---|---|---|---|---|
| ○ | | ○ | | ○ | | ○ | |
| selectA | maskA | selectB | maskB | selectC | maskC | selectD | maskD |
| 1 | 1 | 1 | 1 | 1 | 1 | 1 | 1 |

FIG. 9

| HOLDING BLOCK 12-1 | | HOLDING BLOCK 12-2 | | HOLDING BLOCK 12-3 | | HOLDING BLOCK 12-4 | |
|---|---|---|---|---|---|---|---|
| ○ | | × | | ○ | | ○ | |
| selectA | maskA | selectB | maskB | selectC | maskC | selectD | maskD |
| 1 | 1 | 0 | 0 | 1 | 1 | 1 | 1 |

FIG. 10

| HOLDING BLOCK 12-1 | | HOLDING BLOCK 12-2 | | HOLDING BLOCK 12-3 | | HOLDING BLOCK 12-4 | |
|---|---|---|---|---|---|---|---|
| ○ | | × | | × | | ○ | |
| selectA | maskA | selectB | maskB | selectC | maskC | selectD | maskD |
| 1 | 1 | 0 | 0 | 0 | 0 | 1 | 1 |

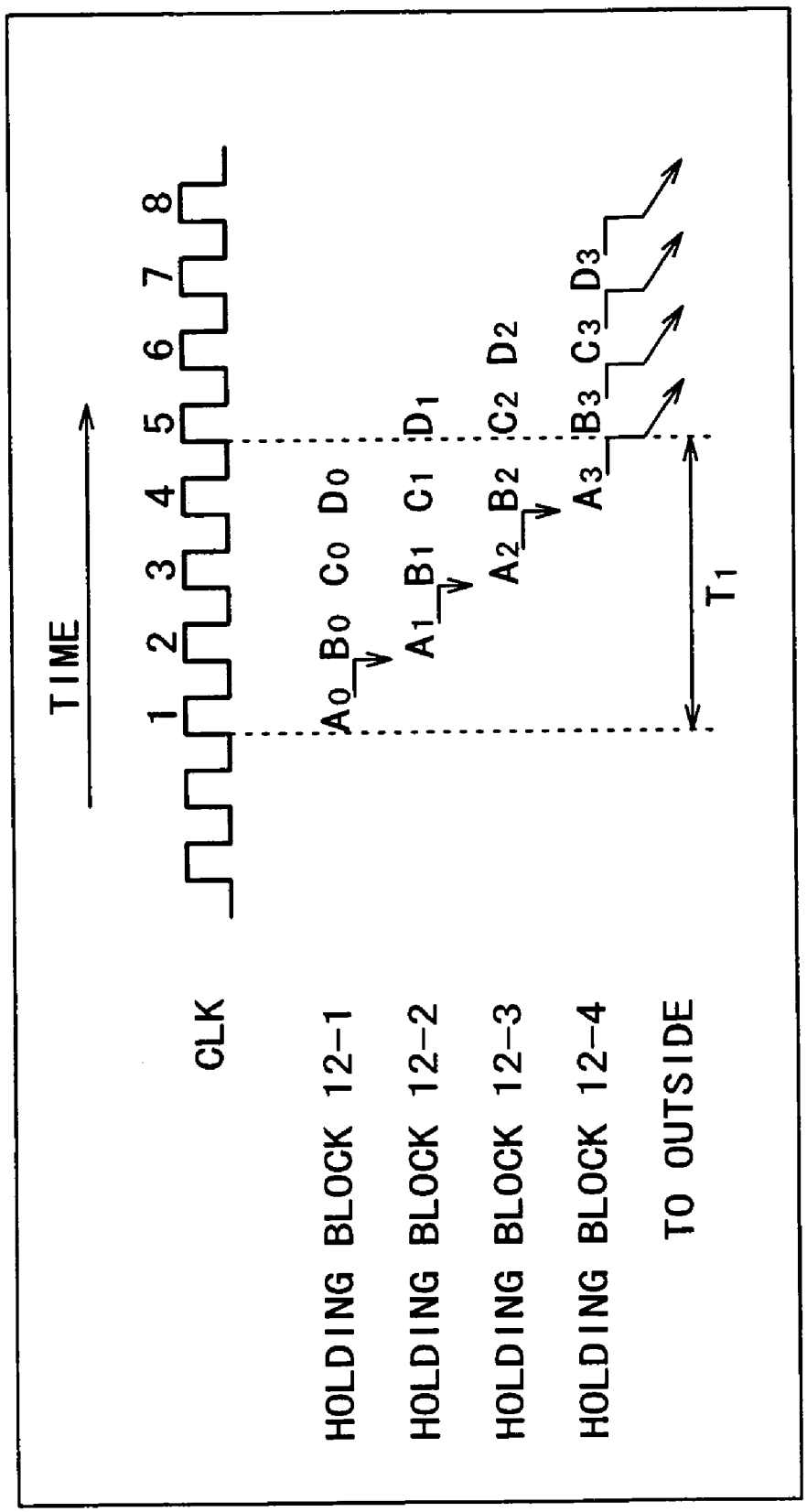

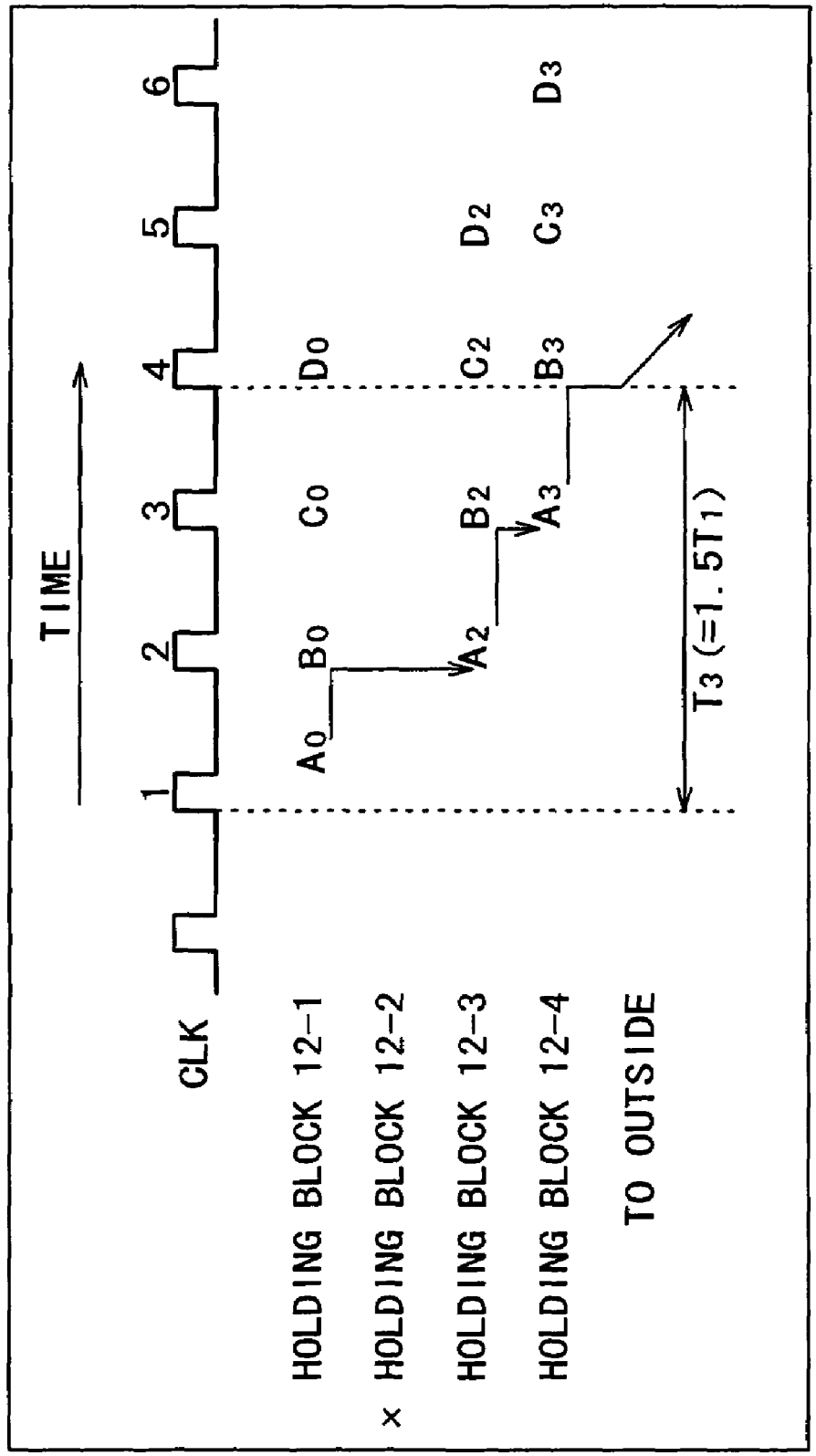

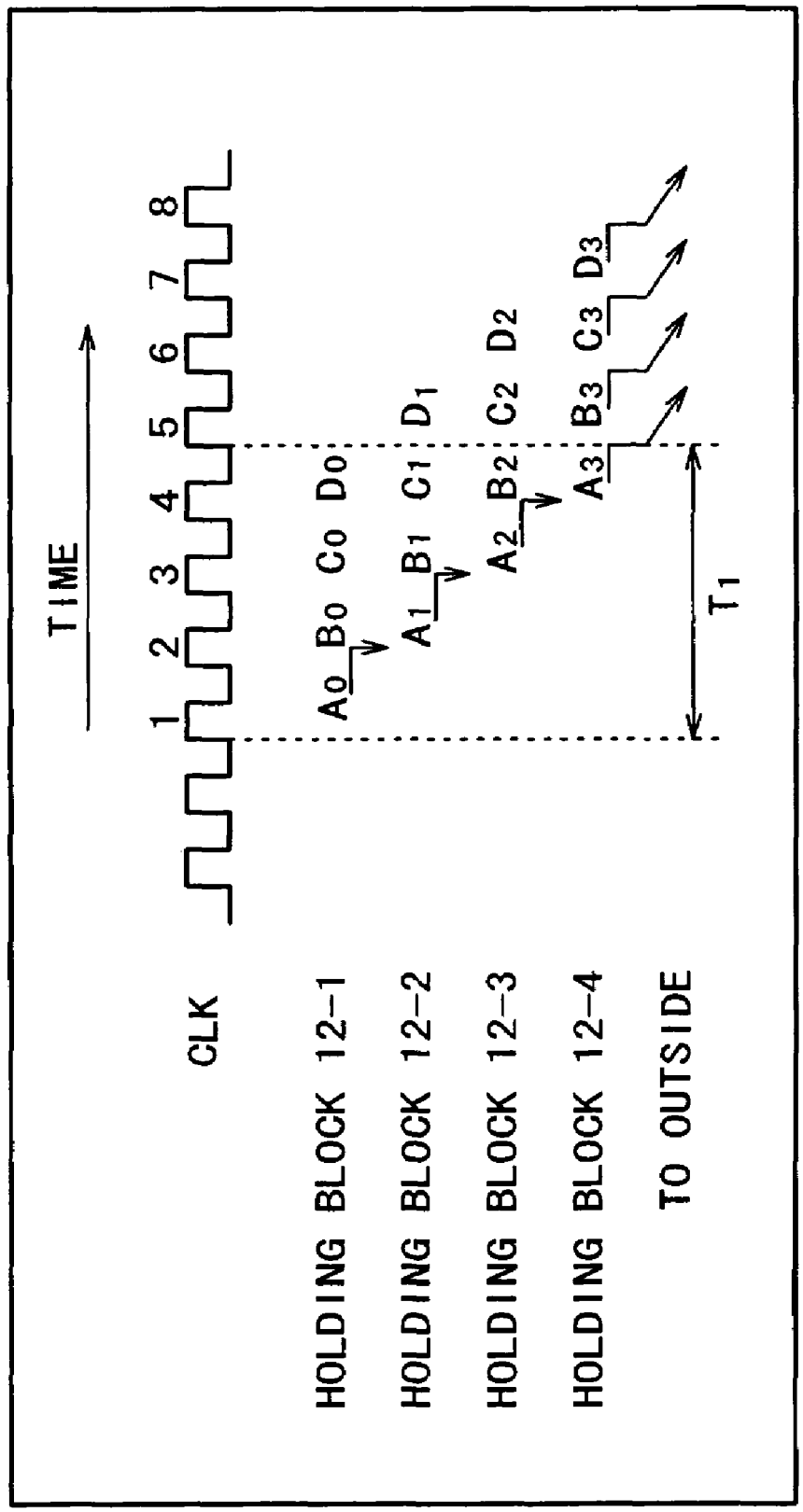

INFORMATION PROCESSING DEVICE, METHOD, AND PROGRAM

TECHNICAL FIELD

The present invention relates to an information processing apparatus, an information processing method, and a program. More particularly, the invention relates to an information processing apparatus as well as to an information processing method and a program for use therewith, the apparatus being arranged to prevent a drop in its processing performance while minimizing power dissipation when a frequency-variable synchronizing clock signal of the apparatus is lowered in frequency.

BACKGROUND ART

Information processing apparatuses typified by data processing apparatuses such as CPUs (central processing units), DSPs (digital signal processors) and filters, as well as buses and data paths for data exchanges perform various operations in synchronism with a synchronizing clock signal (system clock). One such information processing apparatus designed to carry out a process on a plurality of clock pulses include storage devices such as flip-flop circuits that store the results of halfway operations making up the process (e.g., refer to Japanese Patent Laid-open No. 2002-204224).

That type of processing is generally called pipeline processing. The above-mentioned flip-flop circuits or the like for storing halfway processing results constitute what is known as a pipeline. The layout of the pipeline is delimited by so-called segments.

Each of the segments making up the pipeline is generally located where operation status is low, or where the circuits upstream and downstream of the segment in question keep their transition times (i.e., a time period that elapses from the time data is input to the circuit in question until the input data is processed and output) shorter than the cycle of the synchronizing clock signal in use.

Conventionally, when the synchronizing clock signal has a variable frequency, the pipeline is most often constructed (i.e., segmented) to operate primarily in keeping with the highest frequency of the signal. If the frequency of the clock signal is reduced, the transition time of pipeline circuitry falls far short of the synchronizing clock cycle. As a result, with the pipeline designed to function best at the highest synchronizing clock frequency, lowered clock frequencies can appreciably reduce pipeline functionality.

In a related-art system architecture where the synchronizing clock signal is varied in frequency and where the pipeline is designed to operate in keeping with the highest clock frequency, drops in the clock frequency often lead the entire processing performance of the system to deteriorate while power is being consumed wastefully, as outlined above.

FIG. 1 is a block diagram of a related-art information processing apparatus 1 operating on a pipeline basis. As shown in FIG. 1, the information processing apparatus 1 comprises a frequency control block 11 and holding blocks 12-1 through 12-4. The frequency control block 11 varies the frequency of a synchronizing clock signal CLK based on predetermined frequency information Infq, and outputs the synchronizing clock signal CLK at the varied frequency. Each of the holding blocks 12-1 through 12-4 inputs and holds predetermined data on detecting a leading or a trailing edge of a given clock pulse in the synchronizing clock signal CLK from the frequency control block 11, and outputs the data held therein when detecting a leading or a trailing edge of the next clock pulse.

The information processing apparatus 1 also includes a signal processing block 13-1 located between the holding blocks 12-1 and 12-2, a signal processing block 13-2 between the holding blocks 12-2 and 12-3, and a signal processing block 13-3 between the holding blocks 12-3 and 12-4. The signal processing block 13-1 performs a first process on an input signal (i.e., data) and outputs the processed signal; the signal processing block 13-2 carries out a second process on the input signal (data) and outputs the processed signal; and the signal processing block 13-3 executes a third process on the input signal (data) and outputs the processed signal.

In other words, a pipeline is formed by the four holding blocks 12-1 through 12-4 in the information processing apparatus 1. The pipeline is segmented immediately upstream and downstream of each of the signal processing blocks 13-1 through 13-3.

How the information processing apparatus 1 works is described below with reference to FIGS. 2 and 3. Described first with reference to FIG. 2 is how the information processing apparatus 1 operates when the synchronizing clock signal CLK is set for its highest frequency.

In this example, a signal input to the information processing apparatus 1, i.e., a signal entered into the holding block 12-1, is illustratively a data string (A0, B0, C0, D0). The four data items constituting the data string (A0, B0, C0, D0) are input to the holding block 12-1 successively, one at a time per clock pulse.

On a first clock pulse, the data item A0 is input to and held by the holding block 12-1, as shown in FIG. 2.

On a second clock pulse, the holding block 12-1 inputs and holds the data item B0 while outputting the data item A0 concurrently. The data item A0 is converted into a data item A1 after undergoing the first process performed by the signal processing block 13-1. The data item A1 is input to and held by the holding block 12-2 until a third clock pulse is output.

On the third clock pulse, the holding block 12-1 inputs and holds the data item C0 while outputting the data item B0 concurrently. The holding block 12-2 outputs the data item A1 while concurrently inputting a data item B1 derived by the signal processing block 13-1 from the data item B0 that came from the holding block 12-1. The data item B1 is held by the holding block 12-1 until a fourth clock pulse is output. The data item A1 is converted into a data item A2 after undergoing the second process performed by the signal processing block 13-2. The data item A2 is input to and held by the holding block 12-3 until the fourth clock pulse is output.

On the fourth clock pulse, the holding block 12-1 inputs and holds the data item D0 while outputting the data item C0 concurrently. The holding block 12-2 outputs the data item B1 while concurrently inputting a data item C1 derived by the signal processing block 13-1 from the data item C0 that came from the holding block 12-1. The data item C1 is held by the holding block 12-1 until a fifth clock pulse is output. The holding block 12-3 outputs the data item A2 while concurrently inputting a data item B2 derived by the signal processing block 13-2 from the data item B1 that came from the holding block 12-2. The data item B2 is held by the holding block 12-3 until the fifth clock pulse is output. The data item A2 is converted into a data item A3 after undergoing the third process performed by the signal processing block 13-3. The data item A3 is input to and held by the holding block 12-4 until the fifth clock pulse is output.

On the fifth and subsequent clock pulses, each of the holding blocks 12-1 through 12-4 and each of the signal processing blocks 13-1 through 13-3 repeat the operations described above. As a result, the data item A3 is output to the outside on the fifth clock pulse, a data item B3 on a sixth clock pulse, a data item C3 on a seventh clock pulse, and a data item D3 on an eighth clock pulse.

That is, when the synchronizing clock signal CLK is set for its highest frequency, the information processing apparatus 1 inputs the data item A0 on the first clock pulse, and outputs on the fifth clock pulse the data item A3 having undergone the processes performed by the signal processing blocks 13-1 through 13-3. In this case, the time required from the time one data item (one of A0, B0, C0, A0) is input to the information processing apparatus 1 until the input data item is processed and output to the outside (as one of A3, B3, C3, D3) is a time T1, as shown in FIG. 2.

Suppose now that the frequency control block 11, based on newly input frequency information Infq, sets the synchronizing clock signal CLK for half of its highest frequency (indicated in FIG. 2) and outputs the synchronizing clock signal CLK at the reduced frequency. In this case, the synchronizing clock signal CLK appears as depicted in FIG. 3, as opposed to what is shown in FIG. 2.

In the case above, the information processing apparatus 1 also operates in basically the same way as when the synchronizing clock signal CLK is set for its maximum (as indicated in FIG. 2). That is, as illustrated in FIG. 3, the information processing apparatus 1 inputs the data item A0 on the first clock pulse and outputs to the outside on the fifth clock pulse the data item A3 having undergone the processes carried out by the signal processing blocks 13-1 through 13-3.

It should be noted, however, that with the output cycle of the synchronizing clock signal CLK now doubled, it takes twice as long as the time T1 required from the time one data item (one of A0, B0, C0, D0) is input to the information processing apparatus 1 until the input data item is processed and output to the outside (as one of A3, B3, C3, D3). The time T1 (FIG. 2) at the highest clock frequency is now replaced with a time T2 which is twice as long as the time T1.

The processing time (absolute time) of the information processing apparatus 1 at the reduced frequency is twice the time it takes when the frequency is the highest. In other words, the processing performance of the information processing apparatus 1 is reduced to half of what it is when the frequency is maximized.

If the reduction in processing performance triggered by the halving of the clock frequency were kept less than half of the conventionally observed drop, by somehow raising the performance using the same clock signal, there would be power savings commensurate with the rise in the performance per unit power consumption. However, techniques for implementing such an improvement have yet to materialize.

DISCLOSURE OF INVENTION

The present invention has been made in view of the above circumstances and provides arrangements for preventing a drop in the processing performance of an information processing apparatus while minimizing power dissipation when a frequency-variable synchronizing clock signal of the apparatus is lowered in frequency.

In carrying out the invention and according to one aspect thereof, there is provided an information processing apparatus operating in synchronism with a synchronizing clock signal of a predetermined frequency, the information processing apparatus comprising: a clock outputting element for varying the frequency of the synchronizing clock signal in order to output the synchronizing clock signal at the varied frequency; a holding element for inputting and holding data when the clock outputting element outputs a first clock signal pulse, the holding element further outputting the data held therein when the clock outputting element outputs a second clock signal pulse following the first clock signal pulse; a selection command generating element for generating a selection command specifying whether or not to transfer the data by bypassing the holding element in accordance with the frequency of the synchronizing clock signal output by the synchronizing clock outputting element; and a bypassing element for outputting the data by bypassing the holding element if the selection command generated by the selection command generating element specifies that the data be transferred by bypassing the holding element, the bypassing element further outputting the data output by the holding element if the selection command specifies that the data be transferred without bypassing the holding element.

Preferably, the information processing apparatus may further comprise a plurality of groups each made up of the holding element and the bypassing element connected in that order, the plurality of groups being connected in cascaded fashion.

Preferably, the information processing apparatus may further comprise a data processing element for performing a predetermined process on the data; wherein the holding element may input, hold, and output the data having undergone the process performed by the data processing element; and wherein the bypassing element may output the data having undergone the process performed by the data processing element by bypassing the holding element if the selection command specifies that the data be transferred by bypassing the holding element, the bypassing element further outputting the data which, having undergone the process performed by the data processing element, was input to, held in, and output by the holding element if the selection command specifies that the data be transferred without bypassing the holding element.

Preferably, the information processing apparatus may further comprise a stop controlling element for exercising control to stop processing of the holding element if the selection command generated by the selection command generating element specifies that the data be transferred by bypassing the holding element.

Preferably, the selection command generating element may further generate frequency information corresponding to the frequency of the synchronizing clock signal output by the synchronizing clock outputting element, before generating the selection command based on the generated frequency information.

Preferably, the selection command generating element may further receive frequency information which is supplied from an external source and which corresponds to the frequency of the synchronizing clock signal output by the synchronizing clock outputting element, before generating the selection command based on the received frequency information.

According to another aspect of the invention, there is provided an information processing method for use with an information processing apparatus which operates in synchronism with a synchronizing clock signal of a predetermined frequency and which comprises a clock outputting device, a holding device and a bypassing device; wherein the clock outputting device varies the frequency of the synchronizing clock signal in order to output the synchronizing clock signal at the varied frequency; wherein the holding device inputs and holds data when the clock outputting device outputs a first clock signal pulse, the holding device further outputting the data held therein when the clock outputting device outputs a second clock signal pulse following the first clock signal pulse; and wherein the bypassing device includes a first input block for inputting the data by bypassing the holding device, a second input block for inputting the data output by the holding device, and an output block for outputting the data having been input to one of the first input block and the second input block; the information processing method comprising the steps of: generating a selection command specifying whether or not to transfer the data by bypassing the holding device in accordance with the frequency of the synchronizing clock signal output by the synchronizing clock outputting device; and exercising control so as to cause the bypassing device to output from the output block the data having been input to the first input block if the selection command generated in the selection command generating step specifies that the data be transferred by bypassing the holding device, and further to cause the bypassing device to output from the output block the data having been input to the second input block if the selection command specifies that the data be transferred without bypassing the holding device.

According to a further aspect of the invention, there is provided a program for use with a computer for controlling an information processing apparatus which operates in synchronism with a synchronizing clock signal of a predetermined frequency and which comprises a clock outputting device, a holding device and a bypassing device; wherein the clock outputting device varies the frequency of the synchronizing clock signal in order to output the synchronizing clock signal at the varied frequency; wherein the holding device inputs and holds data when the clock outputting device outputs a first clock signal pulse, the holding device further outputting the data held therein when the clock outputting device outputs a second clock signal pulse following the first clock signal pulse; and wherein the bypassing device includes a first input block for inputting the data by bypassing the holding device, a second input block for inputting the data output by the holding device, and an output block for outputting the data having been input to one of the first input block and the second input block; the program causing the computer to carry out the steps of: generating a selection command specifying whether or not to transfer the data by bypassing the holding device in accordance with the frequency of the synchronizing clock signal output by the synchronizing clock outputting device; and exercising control so as to cause the bypassing device to output from the output block the data having been input to the first input block if the selection command generated in the selection command generating step specifies that the data be transferred by bypassing the holding device, and further to cause the bypassing device to output from the output block the data having been input to the second input block if the selection command specifies that the data be transferred without bypassing the holding device.

Where the information processing apparatus, information processing method, and program according to the invention are in use, a selection command is generated on the basis of the frequency of the synchronizing clock signal for the apparatus, the command specifying whether or not to transfer data by bypassing the holding device in the apparatus. If the selection command specifies that data be transferred by bypassing the holding device, then input data is output by bypassing the holding device on a first clock pulse. If the selection command specifies that data be transferred without bypassing the holding device, the input data is first held by the holding device on the first clock pulse, and then output from the holding device on a second clock pulse following the first clock pulse.

As its input data, the information processing apparatus of this invention may either generate its own data or may utilize data supplied from an external source. The inventive information processing apparatus is arranged to operate on the data of its own generation as well as on the externally supplied data.

The information processing apparatus according to the invention may output data to the outside or to a device included in the apparatus. The inventive information processing apparatus may also output data concurrently to the outside as well as to a device within the apparatus. Furthermore, the apparatus of the invention may output data to a plurality of devices inside.

BRIEF DESCRIPTION OF DRAWINGS

FIG. 5 is an explanatory view of an example in which frequency information is encoded when input to a frequency control block of the information processing apparatus shown in FIG. 4.

FIG. 6 is an explanatory view of another example in which frequency information is encoded when input to the frequency control block of the information processing apparatus in FIG. 4.

FIG. 8 is an explanatory view of selection signals generated by a selector control block and mask on/off commands generated by a CLK mask control block inside the frequency control block of the information processing apparatus in FIG. 4.

FIG. 9 is an explanatory view of other selection signals generated by the selector control block and other mask on/off commands generated by the CLK mask control block inside the frequency control block of the information processing apparatus in FIG. 4.

FIG. 10 is an explanatory view of other selection signals generated by the selector control block and other mask on/off commands generated by the CLK mask control block inside the frequency control block of the information processing apparatus in FIG. 4.

FIG. 11 is a timing chart explaining how the information processing apparatus of FIG. 4 typically operates on a synchronizing clock signal set for its highest frequency.

FIG. 12 is a timing chart explaining how the information processing apparatus of FIG. 4 typically operates on the synchronizing clock signal set for half of its highest frequency.

FIG. 13 is another timing chart explaining how the information processing apparatus of FIG. 4 typically operates on the synchronizing clock signal set for its highest frequency.

BEST MODE FOR CARRYING OUT THE INVENTION

Figure 1:
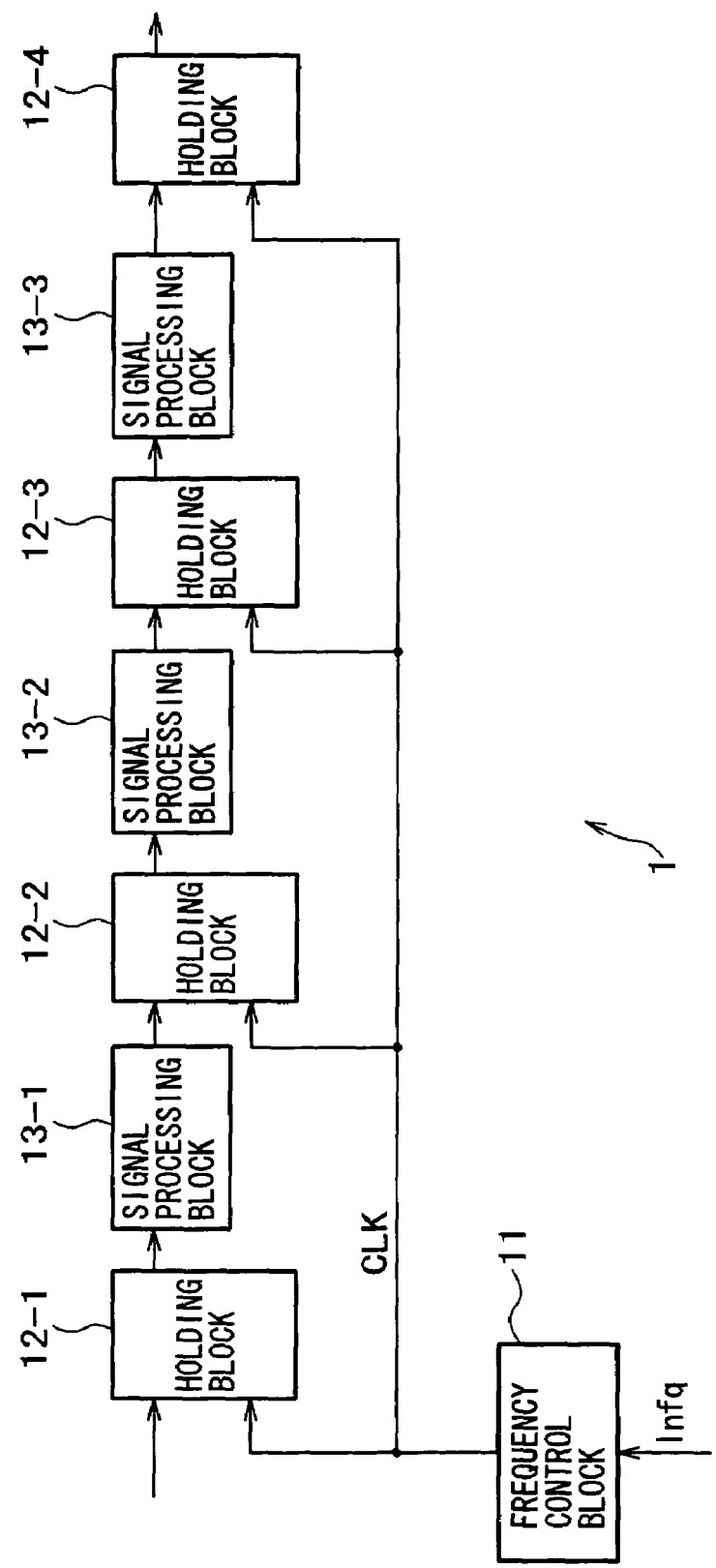
FIG. 1 is a block diagram showing a typical structure of a related-art information processing apparatus.
Figure 4:
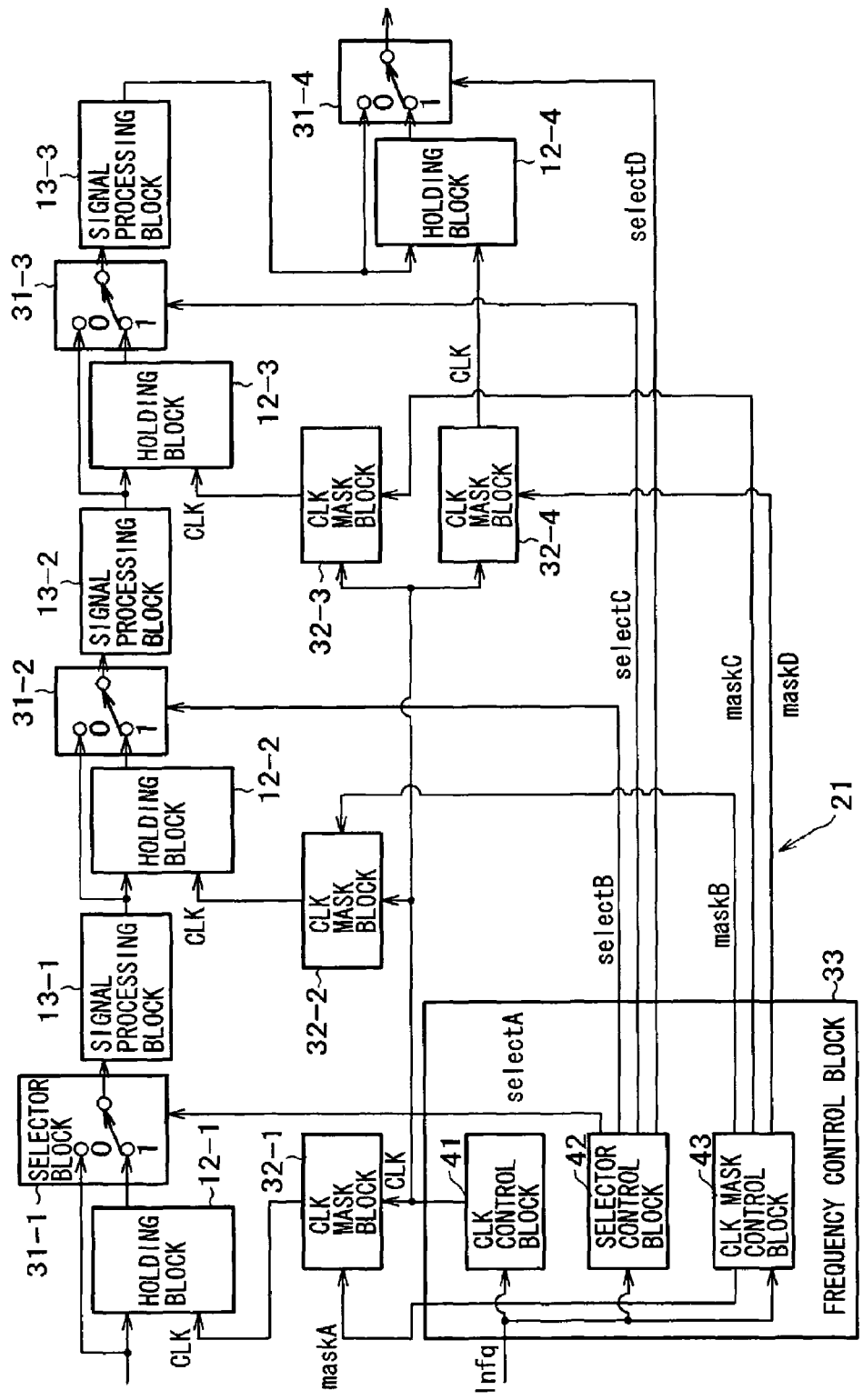
FIG. 4 is a block diagram depicting a typical structure of an information processing apparatus embodying this invention.

FIG. 4 depicts a typical structure of an information processing apparatus 21 embodying this invention. As shown in FIG. 4, the pipeline and its segments in the inventive information processing apparatus 21 are basically the same as those in the above-described related-art information processing apparatus 1 (FIG. 1). As in the setup of FIG. 1, signal processing blocks 13-1 through 13-3 are disposed so that they can perform their processes on input data in their disposed order. The signal processing blocks 13-1 through 13-3 each have one of holding blocks 12-1 through 12-4 located immediately upstream thereof and another holding block disposed immediately downstream, the holding blocks making up the pipeline and corresponding to those in the setup of FIG. 1. (More specifically, the holding block 12-1 is disposed upstream of the signal processing block 13-1, the holding block 12-2 between the signal processing blocks 13-1 and 13-2, the holding block 12-3 between the blocks 13-2 and 13-3, and the holding block 12-4 downstream of the block 13-3.) The holding blocks 12-1 through 12-4 and the signal processing blocks 13-1 through 13-3 are not limited in type as long as they are capable of executing the processing described above. For example, whereas flip-flop circuits are used to constitute the holding blocks 12-1 through 12-4 of this embodiment, the blocks may be implemented alternatively using synchronous RAMs.

The number of holding blocks and that of signal processing blocks are made the same as those in the related-art information processing apparatus 1 (shown in FIG. 1) for comparison purposes. However, the block counts are not limited to those in the setup of FIG. 4 (i.e., four holding blocks 12-1 through 12-4 and three signal processing blocks 13-1 through 13-3). There may be at least one holding block, and any number of signal processing blocks (including the case of no signal processing block) may be provided.

It follows that the information processing apparatus 21 may take diverse forms when embodying the invention. For example, the information processing apparatus 21 may be implemented as a data processor such as a CPU, a DSP or a filter. If the signal processing blocks 13-1 through 13-3 are not included, the information processing apparatus 21 may be formed as a bus or data paths for exchanging data.

The information processing apparatus 21 comprises blocks that are not included in the related-art information processing apparatus 1. These blocks specific to this embodiment are described below.

The information processing apparatus 21 has a selector block 31-1 which is disposed between the holding block 12-1 and the signal processing block 13-1 and which comprises a first input block (indicated by "0" on the input side) and a second input block (denoted by "1" on the input side). The first input block inputs the same signal (data) as that input to the holding block 12-1. The second input block inputs the signal (data) output by the holding block 12-1. Based on a selection command "select A" output by a selector control block 42, to be discussed later, the selector block 31-1 selects one of the first and the second input blocks to allow the data admitted into the selected input block to be output to the signal processing block 13-1.

The selection command "select A" output by the selector control block 42, when used as a signal specifying whether or not to transfer data by bypassing the holding unit 12-1, represents one of two values "0" and "1." In this example, the command "0" illustratively specifies that data be transferred by bypassing the holding block 12-1; the command "1" illustratively specifies that data be passed through the holding block 12-1 when transferred (i.e., the holding block 12-1 is not to be bypassed). Selection commands "select B," "select C" and "select D," to be discussed later, are each assigned the same task as well.

When acquiring the selection command "select A" set for "1," the selector block 31-1 causes the holding block 12-1 to input and hold data on a first clock pulse of the synchronizing clock signal CLK and to forward the data (i.e., the data input to the second input block indicated by "1" in FIG. 4) to the signal processing block 13-1 on a second clock pulse following the first clock pulse.

Given the selection command "select A" set for "0" on a first clock pulse of the synchronizing clock signal CLK, the selector block 31-1 allows the same data as that entering the holding block 12-1 (i.e., the data input to the first input block denoted by "0" in FIG. 4) to be output unchecked to the signal processing block 13-1. That is, when acquiring "0" as the selection command "select A," the selector block 31-1 transfers the input data to the signal processing block 13-1 by bypassing the holding block 12-1.

The information processing apparatus 21 also includes selector blocks 31-2 through 31-4 having the same structure as that of the selector block 31-1. These selector blocks 31-2 through 31-4 are disposed downstream of the holding blocks 12-2 through 12-4 respectively.

More specifically, the selector block 31-2 is located between the holding block 12-2 and the signal processing block 13-2. Given the selection command "select B" set for "0" from the selector control block 42, to be discussed later, the selector block 31-2 transfers input data to the signal processing block 13-2 by bypassing the holding block 12-2. Upon receipt of "1" as the selection command "select B" from the selector control block 42, the selector block 31-2 forwards the data output by the holding block 12-2 to the signal processing block 13-2.

Likewise, the selector block 31-3 is disposed between the holding block 12-3 and the signal processing block 13-3. Given "0" as the selection command "select C" from the selector control block 42, the selector block 31-3 transfers input data to the signal processing block 13-3 by bypassing the holding block 12-3. On receiving "1" as the selection command "select C" from the selector control block 42, the selector block 31-3 transfers the data output by the holding block 12-3 to the signal processing block 13-3.

The selector block 31-4 is located downstream of the holding block 12-4. Given "0" as the selection command "select D" from the selector control block 42, the selector block 31-4 transfers input data to the outside by bypassing the holding block 12-4. Upon receipt of "1" as the selection command "select D" from the selector control block 42, the selector block 31-4 transfers the data output by the holding block 12-4 to the outside.

If any one of the selector blocks 31-1 through 31-4 causes input data to bypass the corresponding one of the holding blocks 12-1 through 12-4, the bypassed holding block has no need to execute its function.

In the information processing apparatus 21, the holding blocks 12-1 through 12-4 are furnished with CLK mask blocks 32-1 through 32-4 respectively. The supply of the synchronizing clock signal CLK to the holding blocks 12-1 through 12-4 is masked as needed by the corresponding CLK mask blocks 32-1 through 32-4.

More specifically, each of the CLK mask blocks 32-1 through 32-4 is disposed between a CLK control block 41 (to be discussed later) outputting the synchronizing clock signal CLK on the one hand, and the corresponding one of the holding blocks 12-1 through 12-4 on the other hand. The CLK mask blocks 32-1 through 32-4 each exercise control either to supply or to mask the synchronizing clock signal CLK output by the CLK control block 41 to the corresponding holding blocks 12-1 through 12-4 on the basis of the content of corresponding mask on/off commands "mask A" through "mask D" output by a CLK mask control block 43 described later.

A mask on/off command "mask A" output by a CLK mask control block 43, when used as a signal specifying whether or not to supply the synchronizing clock signal CLK to the holding block 12-1, represents one of two values "0" and "1." In this example, the command "1" illustratively specifies that the synchronizing clock signal CLK be supplied to the holding block 12-1; the command "0" illustratively specifies that the supply of the synchronizing clock signal CLK to the holding block 12-1 be masked. Mask on/off commands "mask B," "mask C" and "mask D" each are assigned the same task as well.

As described, the information processing apparatus 21 is capable of functionally masking any one of the holding blocks 12-1 through 12-4 by use of the CLK mask blocks 32-1 through 32-4 if the holding block in question need not operate. Any one of the holding blocks 12-1 through 12-4, when not in operation, does not consume power (or saves on power). This translates into an appreciable power savings for the information processing apparatus 21 as a whole.

If any one of the holding blocks 12-1 through 12-4 need not perform its function (i.e., if it is bypassed), the corresponding one of the CLK mask blocks 32-1 through 32-4 masks the supply of the synchronizing clock signal CLK to the holding block in question. It follows that the selection commands "select A" through "select D" correspond in function to the mask on/off commands "mask A" through "mask D" respectively. In this example, if the selection command is "1," the corresponding mask on/off command is "1"; if the selection command is "0," then the corresponding mask on/off command is "0."

Although the mask on/off commands "mask A" through "mask D" are each output by the CLK mask control block 43 in this example, this is not limitative of the invention. As another example, when the selector control block 42 outputs any one of the selection commands "select A" through "select D," the block 42 may also output the corresponding one of the mask on/off commands "mask A" through "mask D." In other words, the selector control block 42 may supply any one of the selector blocks 31-1 through 31-4 with the corresponding one of the selection commands "select A" through "select D" and, by regarding the commands also as representative of the mask on/off commands "mask A" through "mask D," may feed the corresponding one of the CLK mask blocks 32-1 through 32-4 with the mask on/off command represented by the corresponding selection command.

The information processing apparatus 21 further includes a frequency control block 33 constituted by the CLK control block 41, selector control block 42, and CLK mask control block 43. The CLK control block 41 varies the synchronizing clock signal CLK in frequency based on externally supplied frequency information Infq and outputs the clock signal CLK at the varied frequency (the CLK control block 41 corresponds to the related-art frequency control block 11 (in FIG. 1)). The selector control block 42 generates the selection commands "select A" through "select D" based on the frequency of the synchronizing clock signal CLK included in the frequency information Infq and output by the CLK control block 41, and supplies the generated commands to the corresponding selector blocks 31-1 through 31-4. The CLK mask control block 43 generates the mask on/off commands "mask A" through "mask D" and supplies the generated commands to the corresponding CLK mask blocks 32-1 through 32-4.

The frequency information Infq input to the frequency control block 33 may be any information as long as it specifies the frequency of the synchronizing clock signal CLK to be output by the CLK control block 41. Illustratively, the frequency information Infq may be represented by data bits that designate frequencies of the synchronizing clock signal CLK. Alternatively, the frequency information Infq may denote the current frequency of the synchronizing clock signal CLK. As another alternative, the frequency information Infq may represent the next clock frequency ahead of changes in the current frequency of the synchronizing clock signal CLK. As yet another alternative, the frequency information Infq may be a signal that merely denotes changing points of frequency. The frequency information Infq is not limited to the next clock frequency of an upcoming synchronizing clock signal CLK; the information may designate the frequency to be in effect a predetermined number of clock cycles later.

Conceivably, there may be a number of methods for designating frequencies of the synchronizing clock signal CLK. In this example, encoded information is utilized as the frequency information Infq that is decoded when used.

FIGS. 5 and 6 show two encoding methods in tabular form. These methods are obviously not limitative of the invention and may be replaced by other encoding methods.

The encoding method shown in FIG. 5 involves assigning two-bit data to each of varied frequencies of the synchronizing clock signal CLK. In the example of FIG. 5, two-bit data "00" is assigned to a clock signal (CLK) frequency of 10 MHz, "01" to 33 MHz, "10" to 50 MHz, and "11" to 100 MHz. Even if the synchronizing clock signal CLK is varied tenfold, illustratively from 10 MHz to 100 MHz, the data length remains two bits. This method has the advantage of permitting processing without resorting to complicated decoding steps or complex circuit arrangements.

The decoding method indicated in FIG. 6 involves assigning data denoting the inverse of varied frequencies of the synchronizing clock signal CLK. The inverse of a given frequency of the synchronizing clock signal CLK corresponds to one clock cycle of that frequency. In the example of FIG. 6, a data value of "10" is assigned to a synchronizing clock signal (CLK) frequency of 10 MHz, data value of "3" to 33 MHz, "2" to 50 MHz, and "1" to 100 MHz. These data values each correspond to one clock cycle of a given frequency, so that they may each constitute a waiting time through a simple multiplication. More specifically, the frequencies of 10 MHz, 33 MHz, 50 MHz, and 100 MHz of the synchronizing clock signal CLK correspond to clock cycles of 100 ns, 30 ns, 20 ns, and 10 ns. These clock cycles are readily calculated by simply multiplying the above-mentioned data values of 10, 3, 2 and 1 by 10 ns respectively.

In the example of FIG. 4, the frequency information Infq is shown supplied from outside the information processing apparatus 21. However, this is not limitative of the invention. Alternatively, the frequency control block 33 may generate the frequency information Infq on its own.

In the example of FIG. 4, the selector control block 42 generates the selection commands "select A" through "select D" and the CLK mask control block 43 generates the mask on/off commands "mask A" through "mask D," the two blocks generating their commands on the basis of the frequency information Infq. Alternatively, the selector control block 42 and CLK mask control block 43 may generate their commands based on information which differs from the frequency information Infq and which is input from the outside.

How the frequency control block 33 of FIG. 4 operates will now be described with reference to the flowchart of FIG. 7.

In step S1, the CLK control block 41 in the frequency control block 33 outputs a synchronizing clock signal CLK of a predetermined frequency.

In step S2, the frequency control block 33 determines whether frequency information Infq is input.

If in step S2 the frequency information Infq is not found input, the frequency control block 31 returns to step S1 and repeats the subsequent steps. That is, the CLK control block 41 in the frequency control block 31 keeps outputting the synchronizing clock signal CLK of the predetermined frequency until the frequency information Infq is input.

If in step S2 the frequency information Infq is found input, the frequency control block 31 goes to step S3. In step S3, the frequency control block 31 determines whether the information is a command specifying an increase of the frequency.

More specifically, if the frequency contained in the frequency information Infq (in this example, the frequency is obtained by decoding the frequency information Infq shown in FIG. 5 or 6 discussed above) is found higher than the frequency of the currently output synchronizing clock signal CLK, then the frequency control block 31 recognizes the command that specifies an increase of the frequency in step S3.

If the frequency in the frequency information Infq is found equal to or lower than the frequency of the currently output synchronizing clock signal CLK, the frequency control block 31 in step S3 does not recognize the command specifying an increase of the frequency.

If in step S3 the frequency in the frequency information Infq turns out to be the command specifying an increase of the frequency, the frequency control block 33 goes to step S4. In step S4, the frequency control block 33 closes the paths in the information processing apparatus 21. Specifically, the frequency control block 33 allows all data held in the holding blocks 12-1 through 12-4 to be output to the outside (i.e., from the selector block 31-4), before stopping temporarily the data transfers between the holding block 12-1 and the selector block 31-4.

In step S5, the selector control block 42 in the frequency control block 33 generates selection commands "select A" through "select D" on the basis of the frequency corresponding to the frequency information Infq input in step S2 (the frequency is acquired by decoding the frequency information Infq).

In step S6, the selector control block 42 switches inputs in the selector blocks 31-1 through 31-4 based respectively on the selection commands "select A" through "select D" generated in step S5.

More specifically, suppose that the frequency corresponding to the frequency information Infq input in step S2 is the highest frequency and that the information is found to be a command specifying an increase of the frequency in step S3. In that case, the frequency control block 33 determines that none of the holding blocks 12-1 through 12-4 will be bypassed as indicated in FIG. 8 (i.e., data is arranged to pass through all the holding blocks 12-1 through 12-4).

It should be noted that in FIGS. 8, 9 and 10 (to be discussed later), a circle symbol (○) indicates that one of the holding blocks 12-1 through 12-4 which is denoted by that symbol in the figure is not to be bypassed (i.e., the input data is arranged to pass through the holding block in question). By contrast, a cross symbol (X) indicates that one of the holding blocks 12-1 through 12-4 which is designated by that symbol in the figure is to be bypassed (i.e., the input data is not allowed to pass through the holding block in question).

The selector control block 42, as shown in FIG. 8, sets all selection commands "select A" through "select D" for "1" in step S5 (i.e., to generate "1"). In step S6, the selector control block 42 transmits the selection commands each set for "1" to the selector blocks 31-1 through 31-4 respectively.

The selector blocks 31-1 through 31-4 receive the corresponding selection commands "select A" through "select D" as described above. In this case, the received selection commands each set for "1" cause the selector blocks 31-1 through 31-4 to change their settings so as to receive as their inputs the outputs from the corresponding holding blocks 12-1 through 12-4 disposed immediately upstream (i.e., the second input block indicated by "1" in FIG. 4 is switched for the input).

At this point, as shown in FIG. 8, the CLK mask control block 43 sets all mask on/off commands "mask A" through "mask D" for "1" (i.e., to generate "1") in keeping with the selection commands "select A" through "select D," and supplies the generated mask on/off commands to the corresponding CLK mask blocks 32-1 through 32-4.

The CLK mask blocks 32-1 through 32-4 receive the corresponding mask on/off commands "mask A" through "mask D" as described above. In this case, the received mask on/off commands each set for "1" cause the CLK mask blocks 32-1 through 32-4 to let the synchronizing clock signal CLK from the CLK control block 41 be supplied to the corresponding holding blocks 12-1 through 12-4.

Figure 7:
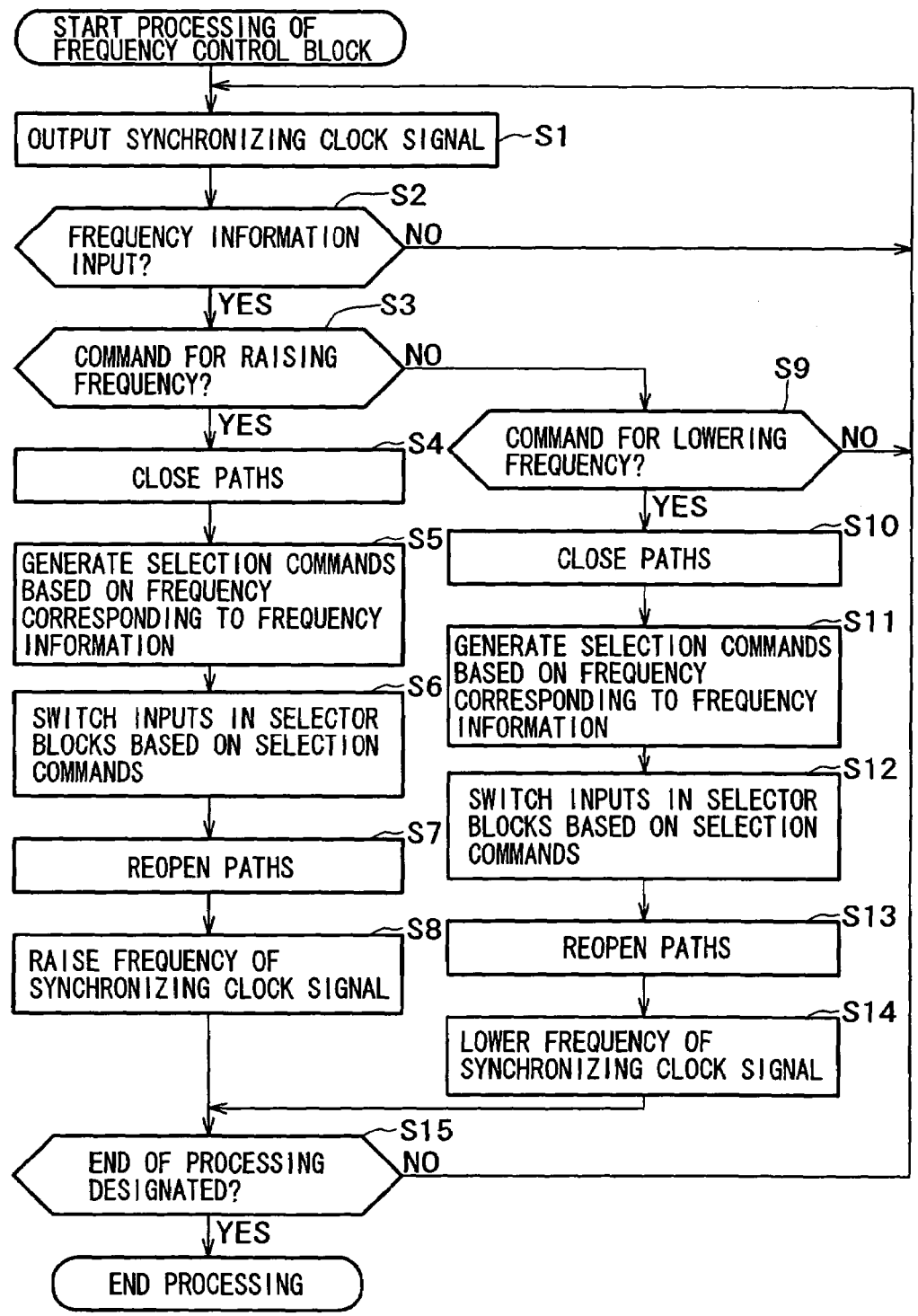
FIG. 7 is a flowchart of steps carried out by the frequency control block of the information processing apparatus in FIG. 4.

In step S7 back in FIG. 7, the frequency control block 33 reopens the paths of the information processing apparatus 21. In step S8, the frequency control block 33 raises the frequency of the synchronizing clock signal CLK to the level of frequency corresponding to the frequency information Infq input in step S2 (the frequency level is obtained by decoding the frequency information Infq).

In step S15, the frequency control block 33 determines whether an end to the processing is designated. If in step S15 an end to the processing is found designated, the frequency control block 33 terminates its function.

If in step S15 an end to the processing is not found designated, the frequency control block 33 returns to step S1 and repeats the subsequent steps.

That is, the CLK control block 41 keeps outputting the synchronizing clock signal CLK at the frequency varied (i.e., raised) in the preceding step S8 (in this case, the signal is set for its highest frequency) until the next frequency information Infq is input.

In that state, suppose that new frequency information Infq in which the highest frequency is encoded is input to the frequency control block 33. In this case, with the CLK control block 41 already outputting the synchronizing clock signal CLK at its highest frequency, the frequency control block 33 determines that the frequency information Infq is input in step S2 and that the information does not constitute a command specifying an increase of the frequency in step S3. In step S9, the frequency control block 33 finds that the information does not constitute a command designating a decrease of the frequency. Thereafter, the frequency control block 33 returns to step S1 and repeats the subsequent steps. That is, the CLK control block 41 keeps outputting the synchronizing clock signal CLK at its highest frequency until the next frequency information Infq is input.

In that state, suppose that new frequency information Infq in which half of the highest frequency is encoded is input to the frequency control block 33. In this case, the frequency control block 33 determines that the frequency information Infq is input in step S2, that the information does not constitute a command specifying an increase of the frequency in step S3, and that the information makes up a command designating a decrease of the frequency in step S9.

In step S10, as in step S4 above, the frequency control block 33 closes the paths of the information processing apparatus 21.

In step S11, as in step S5 above, the selector control block 42 in the frequency control block 33 generates the selection commands "select A" through "select D" based on the frequency (i.e., half of the highest frequency obtained by decoding the frequency information Infq) corresponding to the frequency information Infq input in step S2.

In step S12, as in step S6 above, the selector control block 42 switches the inputs in the selector blocks 31-1 through 31-4 based respectively on the selection commands "select A" through "select D" generated in step S11.

For example, suppose that the frequency control block 33, as shown in FIG. 9, determines that the holding block 12-2 alone is to be bypassed (i.e., input data is not allowed to pass through the holding block 12-2) and that the other holding blocks 12-1, 12-3 and 12-4 are not to be bypassed (i.e., input data is arranged to pass through the holding blocks 12-1, 12-3 and 12-4).

In that case, as shown in FIG. 9, the selector control block 42 sets the selection command "select B" for "0" (to generate "0") in step S11 and sends the command "0" to the selector block 31-2 in step S12. Upon receipt of the selection command "select B" set for "0," as described, the selector block 31-2 changes its settings so as to receive as its input the output from the signal processing block 13-1 (by bypassing the holding block 12-2). That is, the selector block 31-2 changes its settings so that the first input block indicated by "0" in FIG. 4 is switched for the input.

Meanwhile, the selector control block 42 sets the selection commands "select A," "select C" and "select D" for "1" each (to generate "1") in step S11, and transmits the commands to the selector blocks 31-1, 31-3 and 31-4 respectively in step S12.

As described, the received selection commands "select A," "select C" and "select D" each set for "1" cause the corresponding selector blocks 31-1, 31-3 and 31-4 to switch their settings so as to receive as their inputs the outputs from the corresponding holding blocks 12-1, 12-3 and 12-4 (i.e., the second input block indicated by "1" in FIG. 4 is switched for the input).

At this point, as shown in FIG. 9, the CLK mask control block 43 sets (i.e., generates) the mask on/off command "mask A" for "1," "mask B" for "0," "mask C" for "1," and "mask D" for "1" in accordance with the respective selection commands "select A" through "select D," and supplies the generated commands to the corresponding CLK mask blocks 32-1 through 32-4.

As described above, the CLK mask block 32-2 upon receipt of the mask on/off command "mask B" set for "0" exercises control to mask the supply of the synchronizing clock signal CLK from the CLK control block 41 to the holding block 12-2.

Meanwhile, the CLK mask blocks 32-1, 32-3 and 32-4 on receiving respectively the mask on/off commands "mask A," "mask C" and "mask D" each set for "1" exercise control to let the synchronizing clock signal CLK from the CLK control block 41 be supplied to the corresponding holding blocks 12-1, 12-3 and 12-4.

As another example, suppose that the frequency control block 33, as shown in FIG. 10, determines that the holding blocks 12-2 and 12-3 are to be bypassed (i.e., input data is not allowed to pass through the holding blocks 12-2 and 12-3) and that the other holding blocks 12-1 and 12-4 are not to be bypassed (i.e., input data is allowed to pass through the holding blocks 12-1 and 12-4).

In that case, as shown in FIG. 10, the selector control block 42 sets the selection commands "select B" and "select C" for "0" each (to generate "0") in step S11, and sends the generated commands to the selector blocks 31-2 and 31-3 in step S12. Upon receipt of the selection commands "select B" and "select C" set for "0" each, as described, the selector blocks 31-2 and 31-3 change their settings so as to receive as their inputs the outputs from the signal processing blocks 13-1 and 13-2 (by bypassing the holding blocks 12-1 and 12-2). That is, the selector blocks 31-2 and 31-3 change their settings in such a manner that the first input block indicated by "0" in FIG. 4 is switched for the input.

Meanwhile, the selector control block 42 sets the selection commands "select A" and "select D" for "1" each (to generate "1"), and transmits the commands to the selector blocks 31-1 and 31-4.

As described, the received selection commands "select A" and "select D" each set for "1" cause the corresponding selector blocks 31-1 and 31-4 to switch their settings so as to receive as their inputs the outputs from the corresponding holding blocks 12-1 and 12-4 (i.e., the second input block indicated by "1" in FIG. 4 is switched for the input).

At this point, as shown in FIG. 10, the CLK mask control block 43 sets (i.e., generates), in accordance with the respective selection commands "select A" through "select D," the mask on/off command "mask A" for "1," "mask B" for "0," "mask C" for "0," and "mask D" for "1," and supplies the generated commands to the corresponding CLK mask blocks 32-1 through 32-4.

As described above, the CLK mask blocks 32-2 and 32-3 upon receipt of the mask on/off commands "mask B" and "mask C" set for "0" each exercise control to mask the supply of the synchronizing clock signal CLK from the CLK control block 41 to the corresponding holding blocks 12-2 and 12-3.

In the meantime, the CLK mask blocks 32-1 and 32-4 when receiving respectively the mask on/off commands "mask A" and "mask D" each set for "1" exercise control to let the synchronizing clock signal CLK from the CLK control block 41 be supplied to the corresponding holding blocks 12-1 and 12-4.

In step S13 back in FIG. 7, as in step S7 above, the frequency control block 33 reopens the paths of the information processing apparatus 21. In step S14, the frequency control block 33 lowers the frequency of the synchronizing clock signal CLK to the level of frequency corresponding to the frequency information Infq input in step S2 (the frequency level is acquired by decoding the frequency information Infq).

In step S15, the frequency control block 33 determines whether an end to the processing is designated as described. If in step S15 an end to the processing is not found designated, the frequency control block 33 returns to step S1 and repeats the subsequent steps.

That is, the CLK control block 41 keeps outputting the synchronizing clock signal CLK at the frequency varied (i.e., lowered) in the preceding step S14 (in this case, the signal is set for half of its highest frequency) until the next frequency information Infq is input.

If in step S15 an end to the processing is found designated, the frequency control block 33 terminates its function as mentioned above.

Of the series of steps discussed above, steps S4 through S8 following the determination that the frequency information constitutes a command designating an increase of the signal frequency ("YES" in step S3) need to be carried out in the order described. By contrast, steps S10 through S14 subsequent to the determination that the frequency information makes up a command specifying a decrease of the signal frequency ("YES" in step S9) need not be performed exactly in the order described. For example, steps S10 through S13 may be carried out independently of step S14.

Figure 2:
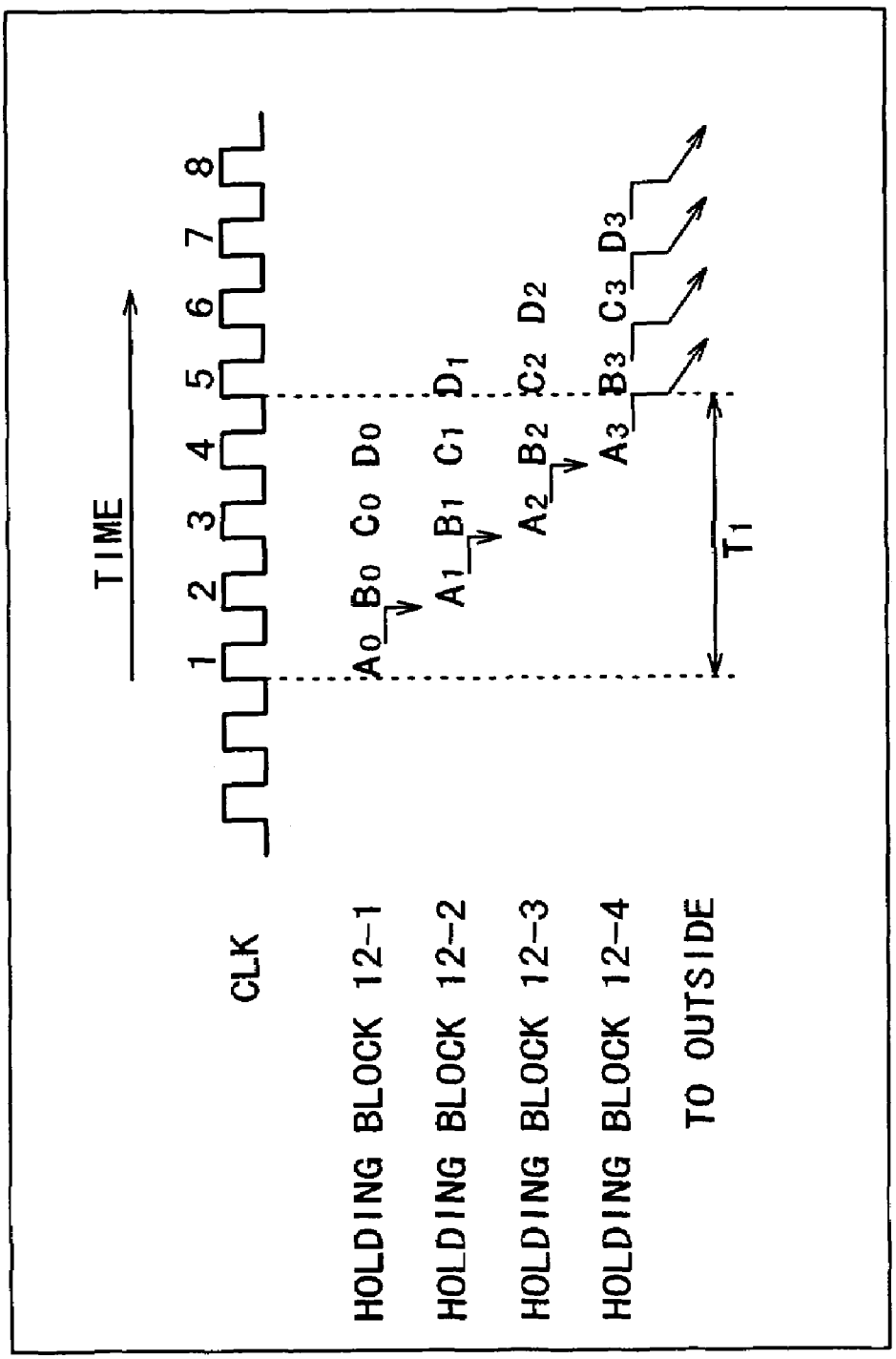
FIG. 2 is a timing chart explaining how the information processing apparatus of FIG. 1 typically operates on a synchronizing clock signal set for its highest frequency.
Figure 3:
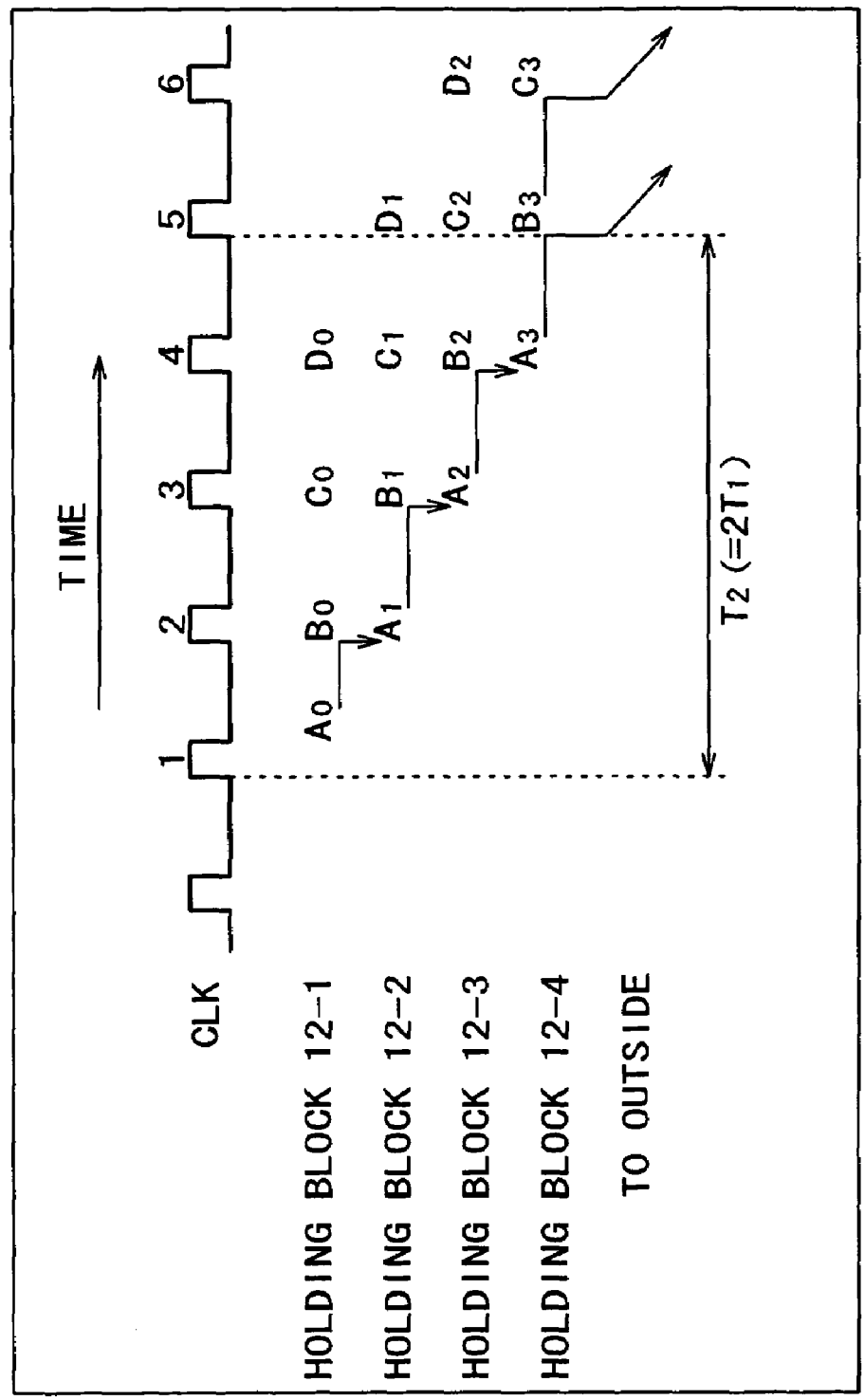
FIG. 3 is a timing chart explaining how the information processing apparatus of FIG. 1 typically operates on the synchronizing clock signal set for half of its highest frequency.

How the information processing apparatus 21 in FIG. 4 works as a whole will now be described with reference to FIGS. 11 through 14. In the description that follows, it is assumed that as with the above-described related-art information processing apparatus 1 (FIG. 1), the signal to be input to the information processing apparatus 21 (i.e., signal to be input to the holding block 12-1) is a data string (A0, B0, C0, D0) and that the four data items constituting the data string (A0, B0, C0, D0) are input to the holding block 12-1 successively, one at a time per clock pulse, as shown in FIGS. 2 and 3.

For example, suppose that the frequency control block 33 carries out steps S1 through S15 in FIG. 7 while outputting the synchronizing clock signal CLK set for its highest frequency. In that case, as discussed above with reference FIG. 8, none of the holding blocks 12-1 through 12-4 will be bypassed (i.e., data is arranged to pass through all the holding blocks 12-1 through 12-4). That is, the information processing apparatus 21 operates as depicted in FIG. 11. Comparing FIG. 11 with FIG. 2 shows clearly that the workings of the information processing apparatus 21 (FIG. 11) in effect when the synchronizing clock signal CLK is output at its highest frequency are basically the same as the workings of the related-art information processing apparatus 1 with the synchronizing clock signal CLK output at its highest frequency in FIG. 2. Thus the workings of the information processing apparatus 21 with the synchronizing clock signal CLK output at its maximum in frequency will not be discussed further.

Suppose now that with the above state in effect, new frequency information Infq in which half of the highest frequency is encoded is input to the frequency control block 33 and that steps S1 through S15 in FIG. 7 are performed in order to output the synchronizing clock signal CLK set for half of its highest frequency. It is assumed here that the holding block 12-2 alone is set to be bypassed (i.e., data is not allowed to pass through the holding block 12-2) as indicated in FIG. 9.

In that case, the information processing apparatus 21 works illustratively as shown in FIG. 12. Specifically, on a first clock pulse, the data item A0 is input to and held by the holding block 12-1.

On a second clock pulse, the holding block 12-1 inputs and holds the data item B0 while outputting the data item A0 concurrently. The data item A0 is allowed to pass through the selector block 31-1 and is converted into the data item A1 after undergoing the first process performed by the signal processing block 13-1. The data item A1 is arranged to bypass the holding block 12-2 (i.e., the data item is not allowed to pass through the holding block 12-2) so as to pass through the selector block 31-2 unchecked. The data item A1 is further converted into the data item A2 after undergoing the second process performed by the signal processing block 13-2. The data item A2 is input to and held by the holding block 12-3 until a third clock pulse is output. The holding block 12-2 does not hold the data item A1 because the block 12-2 is not supplied with the synchronizing clock signal CLK (i.e., the supply of the clock signal is masked by the CLK mask block 32-2).

On the third clock pulse, the holding block 12-1 inputs and holds the data item C0 while outputting the data item B0 concurrently. The holding block 12-3 outputs the data item A2. Until a fourth clock pulse is output, the data item B0 output from the holding block 12-1 is allowed to pass through the selector block 31-1 and converted into the data item B1 by the signal processing block 13-1. The data item B1 is arranged to bypass the holding block 12-2 (i.e., the data is not allowed to pass through the holding block 12-2) so as to pass through the selector block 31-2 and converted into the data item B2 by the signal processing block 13-2. The data item B2 is then input to and held by the holding block 12-3. The data item A2 is allowed to pass through the selector block 31-3 and converted into the data item A3 by the signal processing block 13-3 carrying out the third process. The data item A3 is input to and held by the holding block 12-4 until the fourth clock pulse is output.

On the fourth and subsequent clock pulses, each of the holding blocks 12-1, 12-3 and 12-4 and each of the signal processing blocks 13-1 through 13-3 repeat the operations described above. As a result, the data item A3 is output to the outside on the fourth clock pulse, a data item B3 is output (not shown) on a fifth clock pulse, a data item C3 on a sixth clock pulse, and a data item D3 on a seventh clock pulse.

That is, when the synchronizing clock signal CLK is set for half of its highest frequency and when the holding block 12-2 is bypassed, the information processing apparatus 21 inputs the data item A0 on the first clock pulse, and outputs to the outside on the fourth clock pulse the data item A3 having undergone the processes carried out by the signal processing blocks 13-1 through 13-3.

As described earlier (with reference to FIG. 3), the related-art information processing apparatus 1 operating on the synchronizing clock signal CLK at half of its highest frequency does not bypass any of the holding blocks 12-1 through 12-4 (i.e., input data is arranged to pass through all holding blocks 12-1 through 12-4) when transferring data. For that reason, the data item A0 input on the first clock pulse is converted into the data item A3 and output to the outside on the fifth clock pulse.

By contrast, as described above (with reference to FIG. 12), the information processing apparatus 21 operating on the synchronizing clock signal CLK at half of its highest frequency bypasses one holding block 12-1 when transferring data in the above example. Consequently, the data item A0 input on the first clock pulse is converted into the data item A3 and output to the outside by the inventive apparatus 21 on the fourth clock pulse, one clock pulse earlier than by the related-art apparatus 1.

As a result, whereas the related-art information processing apparatus 1 (FIG. 1) when processing input data on the synchronizing clock signal CLK at half of its highest frequency takes twice as long as the processing time T1 at the highest frequency (=2T1), the inventive information processing apparatus 21 (FIG. 4) operating on the same clock signal takes one and a half times T3 the processing time T1 at the highest frequency (i.e., T3=1.5T1). This amounts to a significant savings in processing time.

When the frequency of the synchronizing clock signal CLK is lowered, the information processing apparatus 21 of this invention manages the resulting decline in performance better than the related-art information processing apparatus 1, thus maintaining a relatively high level of processing capability at reduced clock signal frequencies. In other words, the inventive information processing apparatus 21 operating on the synchronizing clock signal CLK at reduced frequencies provides higher performance than its related-art counterpart 1.

The holding block 12-2, when bypassed, stops its function because the synchronizing clock signal CLK is cut off (i.e., the signal is masked by the CLK mask block 32-2). That means the power dissipation by the holding block 12-2 is reduced. In other words, the inventive information processing apparatus 21 operating on the synchronizing clock signal CLK at reduced frequencies consumes less power than its related-art counterpart 1.

As described, each of the selection signals "select A" through "select D" functions independently. This makes it possible to determine whether or not to bypass any of the holding blocks 12-1 through 12-4 independently of one another. It follows that with the information processing apparatus 21, the number of holding blocks 12-1 through 12-4 to be bypassed or the identities of the bypassed blocks are not limited as long as the bypassing is executable per clock pulse; any number of holding blocks or their identities may be selected as desired.

In order to boost the performance of the information processing apparatus 21 and to reduce its power dissipation, what is needed is simply to increase the number of holding blocks 12-1 through 12-4 to be bypassed as long as the bypassing is feasible per clock pulse.

In the preceding example, the workings of the information processing apparatus 21 were described on the assumption that the synchronizing clock signal CLK is output at half of its highest frequency and that the holding block 12-2 alone is bypassed (i.e., data is not allowed to pass through the holding block 12-2).

In another example, it is possible further to boost the performance of the information processing apparatus 21 and to reduce its power dissipation by bypassing two holding blocks 12-2 and 12-3 (i.e., data is not allowed to pass through the holding blocks 12-2 and 12-3), with the synchronizing clock signal CLK output at half of its highest frequency as described above (with reference to FIG. 10).

Figure 14:
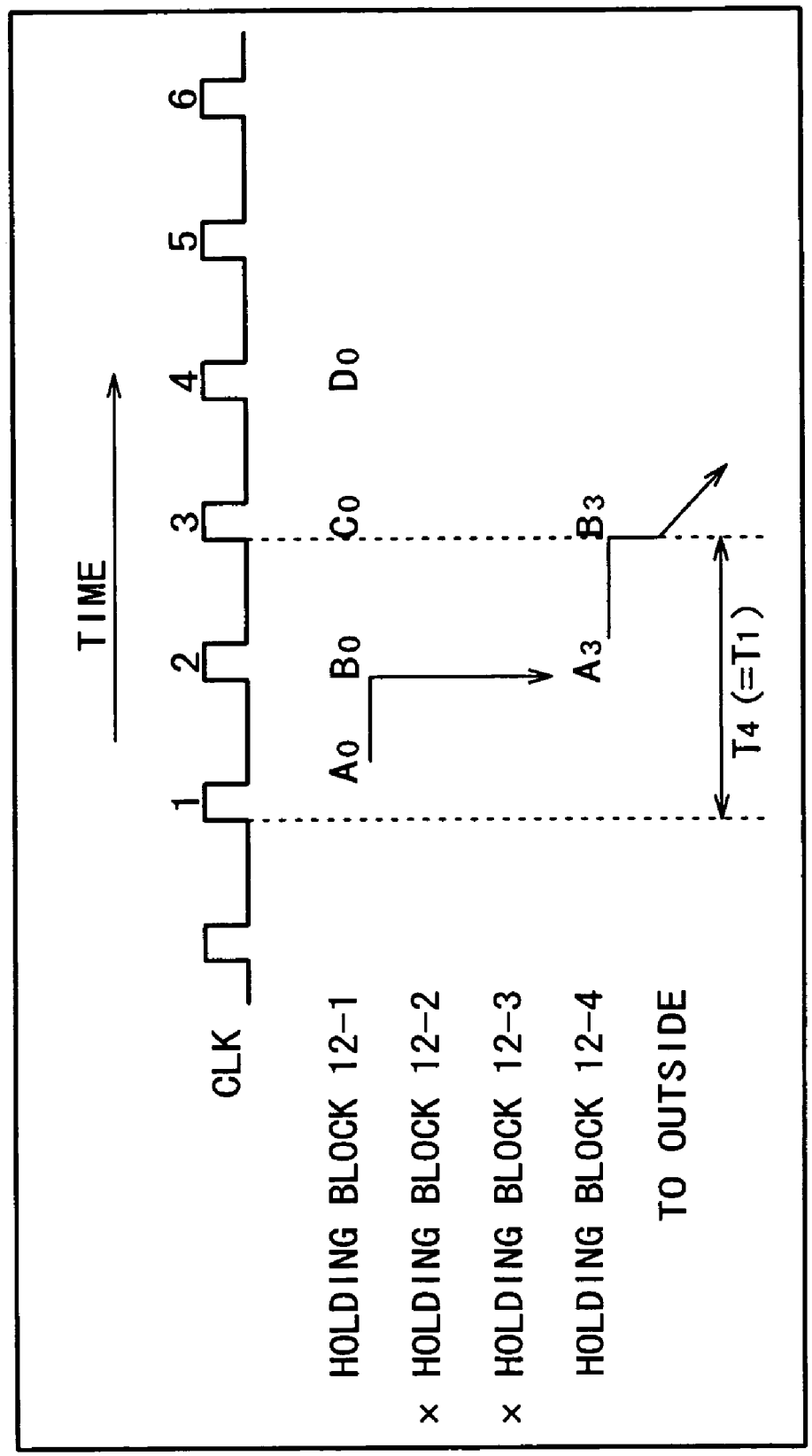
FIG. 14 is a timing chart explaining how the information processing apparatus of FIG. 4 otherwise operates on the synchronizing clock signal set for half of its highest frequency.

FIG. 14 illustrates the workings of the information processing apparatus 21 in effect when the two holding blocks 12-2 and 12-3 are bypassed with the synchronizing clock signal CLK output at half of its highest frequency. FIG. 13, identical to FIG. 11 (FIG. 2) in content, depicts for comparison purposes the workings of the information processing apparatus 21 in effect when the synchronizing clock signal CLK is output at its highest frequency.

On a first clock pulse as shown in FIG. 14, the data item A0 is input to and held by the holding block 12-1.

On a second clock pulse, the data item B0 is input to and held by the holding block 12-1 which outputs the data item A0 concurrently.

The data item A0 is arranged to pass through the selector block 31-1 and converted into the data item A1 by the signal processing block 13-1 performing the first process. The data item A1 is arranged to bypass the holding block 12-2 (i.e., data is not allowed to pass through the holding block 12-2) and to pass through the selector block 31-2 unchecked. The data item A1 is converted into the data item A2 by the signal processing block 13-2 carrying out the second process. The data item A2 is arranged to bypass the holding block 12-3 (i.e., data is not allowed to pass through the holding block 12-3) and to pass through the selector block 31-3 unchecked. The data item A2 is then converted into the data item A3 by the signal processing block 13-3 carrying out the third process. The data item A2 is then input to and held by the holding block 12-4 until a third clock pulse is output.

The holding blocks 12-2 and 12-3 do not hold the data item A1 or A2 because they are not supplied with the synchronizing clock signal CLK (i.e., supply of the signal to the two blocks is masked by the CLK mask blocks 32-2 and 32-3 respectively).

On the third and subsequent clock pulses, each of the holding blocks 12-1 and 12-4 and each of the signal processing blocks 13-1 through 13-3 repeat the operations described above. As a result, the data item A3 is output to the outside on the third clock pulse, the data item B3 is output on a fourth clock pulse (not shown), a data item C3 on a fifth clock pulse, and a data item D3 on a sixth clock pulse.

That is, when the synchronizing clock signal CLK is set for half of its highest frequency and when the holding blocks 12-2 and 12-3 are bypassed, the information processing apparatus 21 inputs the data item A0 on the first clock pulse and outputs to the outside on the third clock pulse the data item A3 having undergone the processes carried out by the signal processing blocks 13-1 through 13-3.

As described earlier (with reference to FIG. 12), when the information processing apparatus 21 operates on the synchronizing clock signal CLK at half of its highest frequency and bypasses the holding block 12-2 alone, the data item A0 input on the first clock is converted into the data item A3 and output to the outside on the fourth clock pulse.

By contrast, in the preceding example (described with reference to FIG. 14), the information processing apparatus 21 operating on the synchronizing clock signal CLK at half of its highest frequency bypasses the two holding blocks 12-2 and 12-3. In this case, the data item A0 input on the first clock pulse is converted into the data item A3 and output to the outside on the third clock pulse, one clock pulse earlier than with only one holding block 12-2 bypassed.

The information processing apparatus 21, when bypassing the holding block 12-2 alone and operating on the synchronizing clock signal CLK at half of its highest frequency, takes one and a half times the processing time T1 at the highest frequency (=1.5T1), as shown in FIG. 12. On the other hand, the apparatus 21 when bypassing the two holding blocks 12-2 and 12-3 and operating on the same clock signal takes the same time T4 as the processing time T1 in effect when the apparatus 21 operates at the highest frequency (i.e., T4=T1), as depicted in FIG. 14. This amounts to a further savings in processing time.

Because the holding block 12-3 is arranged to stop its function in addition to the already halted holding block 12-2, the savings in power by the inactive holding block 12-2 is supplemented by the economies achieved by the inoperative holding block 12-3. In other words, the power dissipation of the information processing apparatus 21 is reduced further (i.e., lowered).

The series of steps and processes described above may be executed either by hardware or by software. In either case, the holding blocks 12-1 through 12-4, selector blocks 31-1 through 31-4, and signal processing blocks 13-1 through 13-3 may be implemented illustratively by a CPU (central processing unit) 61 of a personal computer 51 shown in FIG. 15. If the signal processing blocks 13-1 through 13-3 are omitted, then the holding blocks 12-1 through 12-4 and selector blocks 31-1 through 31-4 in the information processing apparatus 21 of FIG. 4 may be implemented illustratively in the form of a bus 64 or an input/output interface 65 of the personal computer 51.

Figure 15:
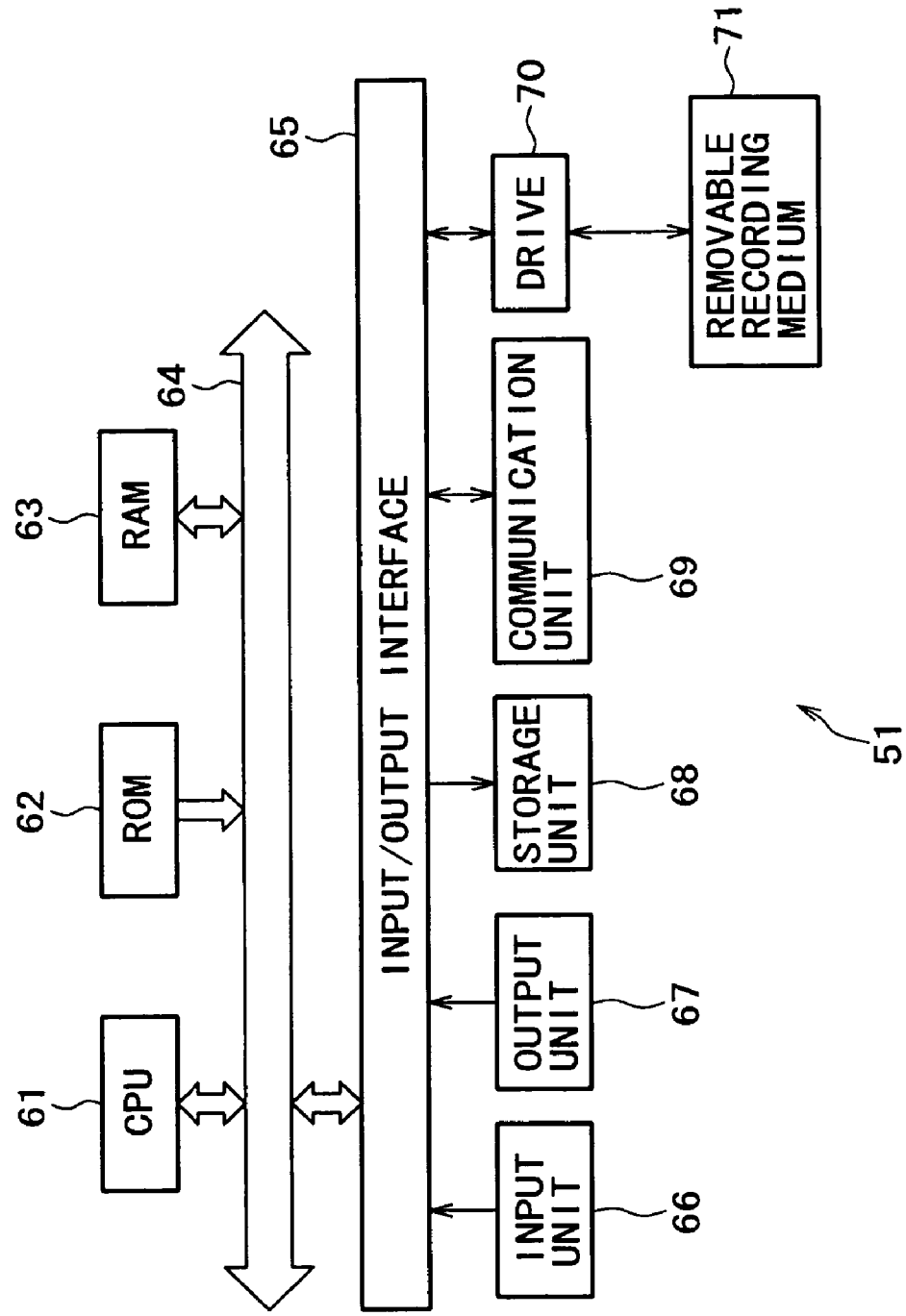
FIG. 15 is a block diagram outlining a typical structure of a personal computer that incorporates the information processing apparatus of FIG. 4.

Referring to FIG. 15, the CPU 61 carries out diverse processes in accordance with programs stored in a ROM (read only memory) 62 or with programs loaded into a RAM (random access memory) 63 from a storage unit 68. The RAM 63 may also accommodate data needed by the CPU 61 in executing its processes.

The programs to be performed by the CPU 61 illustratively include modules corresponding to the frequency control block 33 and CLK mask blocks 32-1 through 32-4 in FIG. 4. Each of these modules is given an independent algorithm and operates in keeping therewith. The modules are each read out and executed by the CPU 61 as needed.

The CPU 61, ROM 62, and RAM 63 are interconnected by the bus 64. The input/output interface 65 is also connected to the bus 64.

The input/output interface 65 is connected with an input unit 66 illustratively made up of a keyboard, an output unit 67 typically composed of a display device, the storage unit 68 usually comprising a hard disk drive, and a communication unit 69 for performing communications with other apparatuses (not shown) via a network (not shown) such as the Internet.

The input/output interface 65 is further connected as needed with a drive 70 into which is loaded a removable recording medium 71 such as a magnetic disk, an optical disk, a magneto-optical disk, or a semiconductor memory. Computer programs retrieved from the medium 71 by the drive 70 are installed as needed into the storage unit 68.

The programs constituting the series of steps and processes described above are installed over the network or from a storage medium. As shown in FIG. 15, the storage medium is offered to the user apart from the apparatus not only as the removable recording medium (package medium) 71 such as magnetic disks (including floppy disks), optical disks (including CD-ROM (compact disk-read only memory) and DVD (digital versatile disk)), magneto-optical disks (including MD (Mini-Disk)), or semiconductor memories which contain the programs and which are loaded into the drive 70 for use; but also in the form of the ROM 62, the hard disk drive in the storage unit 68 or the like which is incorporated beforehand in the apparatus and which carries the programs.

In this description, the steps constituting the series of processes described above represent not only the processes that are to be carried out in the depicted sequence (i.e., on a time series basis) but also processes that may be performed parallelly or individually.

INDUSTRIAL APPLICABILITY

As described and according to the invention, the frequency of the synchronizing clock signal for use with the information processing apparatus is allowed to vary. In particular, when the signal frequency is reduced from its highest level, the resulting drop in the performance of the apparatus is minimized and its power dissipation is lessened.

The invention claimed is:

1. An information processing apparatus operating in synchronism with a synchronizing clock signal of a predetermined frequency, said information processing apparatus comprising:
    clock outputting means for varying said frequency of said synchronizing clock signal in order to output said synchronizing clock signal at the varied frequency;
    holding means for inputting and holding data when said clock outputting means outputs a first clock signal pulse, said holding means further outputting said data held therein when said clock outputting means outputs a second clock signal pulse following said first clock signal pulse;
    selection command generating means for generating a selection command specifying whether or not to transfer said data by bypassing said holding means in accordance with the frequency of said synchronizing clock signal output by said synchronizing clock outputting means; and
    bypassing means for outputting said data by bypassing said holding means if said selection command generated by said selection command generating means specifies that said data be transferred by bypassing said holding means, said bypassing means further outputting said data output by said holding means if said selection command specifies that said data be transferred without bypassing said holding means,
    wherein when the holding means is bypassed, said synchronizing clock signal supplied to the holding means is cut off.

2. An information processing apparatus according to claim 1, further comprising a plurality of groups each made up of said holding means and said bypassing means connected in that order, said plurality of groups being connected in cascaded fashion.

3. An information processing apparatus according to claim 1, further comprising data processing means for performing a predetermined process on said data;
    wherein said holding means inputs, holds, and outputs said data having undergone said process performed by said data processing means; and
    wherein said bypassing means outputs said data having undergone said process performed by said data processing means by bypassing said holding means if said selection command specifies that said data be transferred by bypassing said holding means, said bypassing means further outputting said data which, having undergone said process performed by said data processing means, was input to, held in, and output by said holding means if said selection command specifies that said data be transferred without bypassing said holding means.

4. An information processing apparatus according to claim 1, further comprising stop controlling means for exercising control to stop processing of said holding means if said selection command generated by said selection command generating means specifies that said data be transferred by bypassing said holding means.

5. An information processing apparatus according to claim 1, wherein said selection command generating means further generates frequency information corresponding to said frequency of said synchronizing clock signal output by said synchronizing clock outputting means, before generating said selection command based on the generated frequency information.

6. An information processing apparatus according to claim 1, wherein said selection command generating means further receives frequency information which is supplied from an external source and which corresponds to said frequency of said synchronizing clock signal output by said synchronizing clock outputting means, before generating said selection command based on the received frequency information.

7. An information processing method for use with an information processing apparatus which operates in synchronism with a synchronizing clock signal of a predetermined frequency and which comprises a clock outputting device, a holding device and a bypassing device;
    wherein said clock outputting device varies said frequency of said synchronizing clock signal in order to output said synchronizing clock signal at the varied frequency;
    wherein said holding device inputs and holds data when said clock outputting device outputs a first clock signal pulse, said holding device further outputting said data held therein when said clock outputting device outputs a second clock signal pulse following said first clock signal pulse; and wherein said bypassing device includes a first input block for inputting said data by bypassing said holding device, a second input block for inputting said data output by said holding device, and an output block for outputting said data having been input to one of said first input block and said second input block;

said information processing method comprising the steps of:

generating a selection command specifying whether or not to transfer said data by bypassing said holding device in accordance with the frequency of said synchronizing clock signal output by said synchronizing clock outputting device;

exercising control so as to cause said bypassing device to output from said output block said data having been input to said first input block if said selection command generated in said selection command generating step specifies that said data be transferred by bypassing said holding device, and further to cause said bypassing device to output from said output block said data having been input to said second input block if said selection command specifies that said data be transferred without bypassing said holding device; and cutting off said synchronizing clock signal supplied to the holding means when the holding means is bypassed.

8. A computer readable storage medium encoded with instructions, which when executed by a computer causes the computer to control an information processing apparatus which operates in synchronism with a synchronizing clock signal of a predetermined frequency and which comprises a clock outputting device, a holding device and a bypassing device;

wherein said clock outputting device varies said frequency of said synchronizing clock signal in order to output said synchronizing clock signal at the varied frequency;

wherein said holding device inputs and holds data when said clock outputting device outputs a first clock signal pulse, said holding device further outputting said data held therein when said clock outputting device outputs a second clock signal pulse following said first clock signal pulse; and wherein said bypassing device includes a first input block for inputting said data by bypassing said holding device, a second input block for inputting said data output by said holding device, and an output block for outputting said data having been input to one of said first input block and said second input block;

said instructions causing said computer to carry out the steps of:

generating a selection command specifying whether or not to transfer said data by bypassing said holding device in accordance with the frequency of said synchronizing clock signal output by said synchronizing clock outputting device; and exercising control so as to cause said bypassing device to output from said output block said data having been input to said first input block if said selection command generated in said selection command generating step specifies that said data be transferred by bypassing said holding device, and further to cause said bypassing device to output from said output block said data having been input to said second input block if said selection command specifies that said data be transferred without bypassing said holding device, cutting off said synchronizing clock signal supplied to the holding means when the holding means is bypassed.

9. An information processing apparatus operating in synchronism with a synchronizing clock signal of a predetermined frequency, said information processing apparatus comprising:

a clock outputting unit configured to vary said frequency of said synchronizing clock signal in order to output said synchronizing clock signal at the varied frequency;

a holding unit configured to input and hold data when said clock outputting unit outputs a first clock signal pulse, said holding unit further configured to output said data held therein when said clock outputting unit outputs a second clock signal pulse following said first clock signal pulse;

a selection command generating unit configured to generate a selection command specifying whether or not to transfer said data by bypassing said holding unit in accordance with the frequency of said synchronizing clock signal output by said synchronizing clock outputting unit; and a bypassing unit configured to output said data by bypassing said holding unit if said selection command generated by said selection command generating unit specifies that said data be transferred by bypassing said holding unit, said bypassing unit further outputting said data output by said holding unit if said selection command specifies that said data be transferred without bypassing said holding unit, wherein when the holding unit is bypassed, said synchronizing clock signal supplied to the holding unit is cut off.

10. The information processing apparatus of claim 1, further comprising:

means for cutting off said synchronizing clock signal supplied to the holding means.

11. The method of claim 7, wherein said cutting off is performed with a clock mask circuit.

12. The computer readable storage medium of claim 8, wherein the cutting off is performed with a clock mask circuit.

13. The information processing apparatus of claim 1, further comprising:

a clock mask circuit configured to cut off said synchronizing clock signal supplied to the holding unit.

\* \* \* \* \*